United States Patent [19]

Morishita et al.

[11] Patent Number: 4,838,172
[45] Date of Patent: Jun. 13, 1989

[54] TRANSPORTING SYSTEM OF FLOATED CARRIER TYPE

[75] Inventors: Mimpei Morishita; Teruo Azukizawa, both of Tokyo, Japan

[73] Assignee: Kabushiki Kaisha Toshiba, Kawasaki, Japan

[21] Appl. No.: 49,346

[22] Filed: May 13, 1987

[30] Foreign Application Priority Data

May 14, 1986 [JP] Japan .................. 61-109915

[51] Int. Cl.$^4$ ............................................ B60L 13/06
[52] U.S. Cl. ...................... 104/281; 104/284; 104/293
[58] Field of Search .................. 104/281–284, 104/286, 289, 290, 293–296, 302, 303, 307; 318/135; 246/122 R, 182 A, 182 B

[56] References Cited

U.S. PATENT DOCUMENTS

| | | | |
|---|---|---|---|
| 3,377,616 | 4/1968 | Auer, Jr. | 246/122 R |
| 3,736,880 | 6/1973 | Ross | 104/284 X |
| 3,899,979 | 8/1975 | Godsey, Jr. | 104/284 X |
| 3,937,148 | 2/1976 | Simpson | 104/284 X |
| 4,505,206 | 3/1986 | Gottzein et al. | 104/284 |

FOREIGN PATENT DOCUMENTS

| | | | |
|---|---|---|---|
| 0179188 | 4/1986 | European Pat. Off. | 104/284 |
| 51-100515 | 9/1976 | Japan . | |
| 52-88913 | 7/1977 | Japan . | |
| 0007304 | 1/1987 | Japan | 104/284 |

Primary Examiner—Dennis H. Pedder
Assistant Examiner—Dean Kramer
Attorney, Agent, or Firm—Oblon, Fisher, Spivak, McClelland & Maier

[57] ABSTRACT

In a transporting system, four magnetic units are mounted on corners of carrier and the carrier is suspended under rails by electromagnetic attractive forces acting between the magnetic units and the bottom section of the rails. Each of the magnetic unit has a permanent magnet and electromagnets and gap sensors are provided on the carrier to sense a gap between each magnetic unit and rail. A battery for supplying a current to the magnetic unit is mounted on the carrier 15. The carrier is floated in a zero steady-state power control mode, even when an external force is applied to the carrier by a zero steady-state power control circuit which maintain the steady-state current supplied to the magnetic unit to be substantially zero. The carrier is softly landed on the rail or started to move from the rail in response to an external command in a soft landing or a soft start mode by an actuating unit 67. In the soft landing and the soft start mode, the zero steady-state power control circuit is opened and the current supplied to the magnetic unit is controlled in accordance with a target value by an actuating unit.

8 Claims, 12 Drawing Sheets

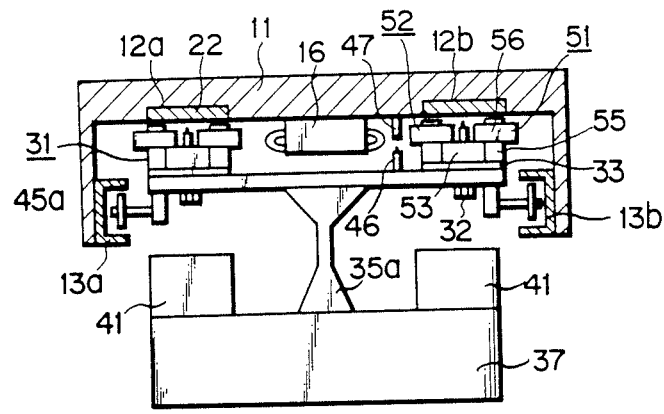
F I G. 2
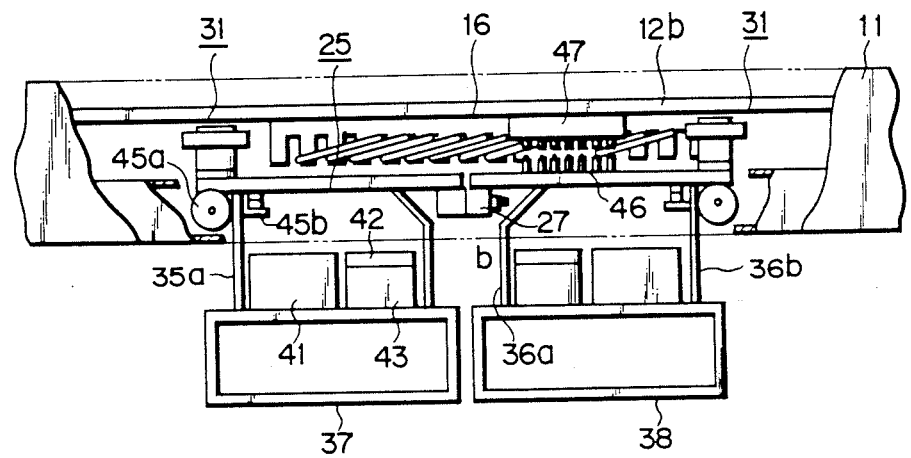
F I G. 3
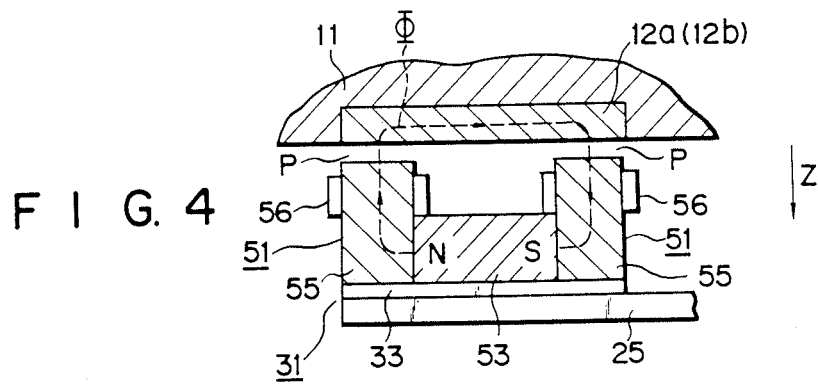
F I G. 4

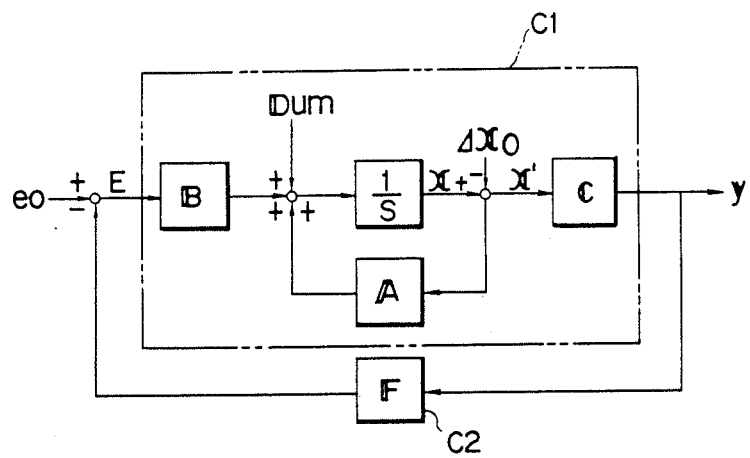
F I G. 5
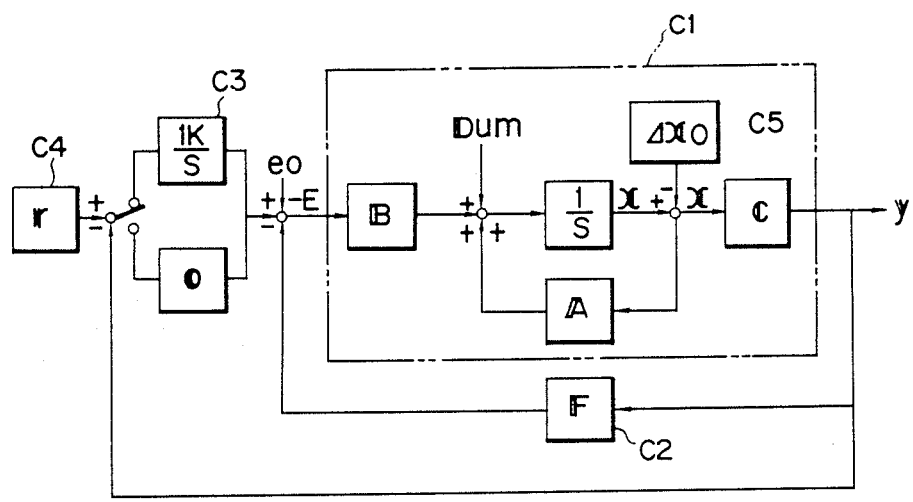
F I G. 6

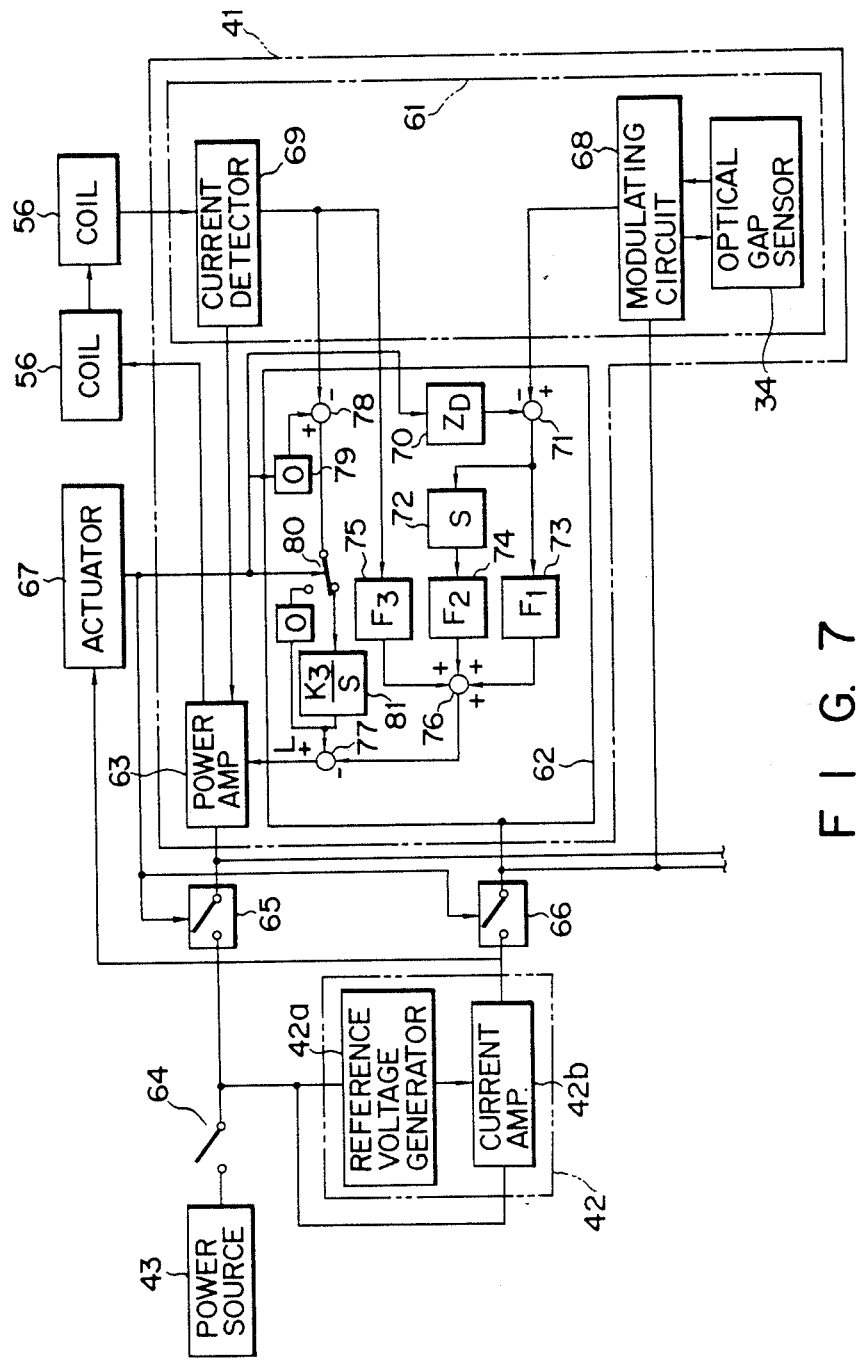
F I G. 7

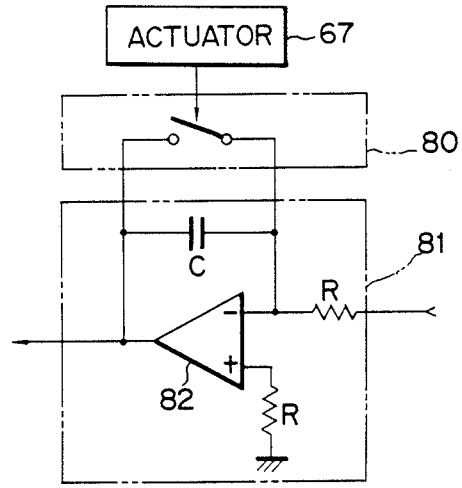
F I G. 8
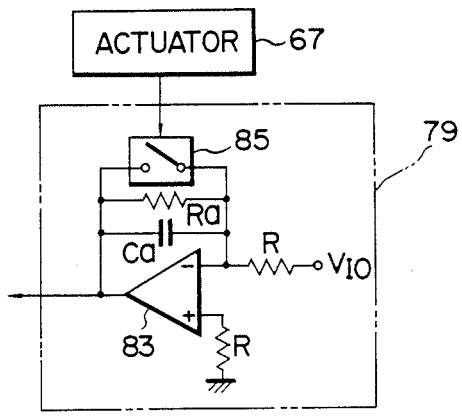
F I G. 9A
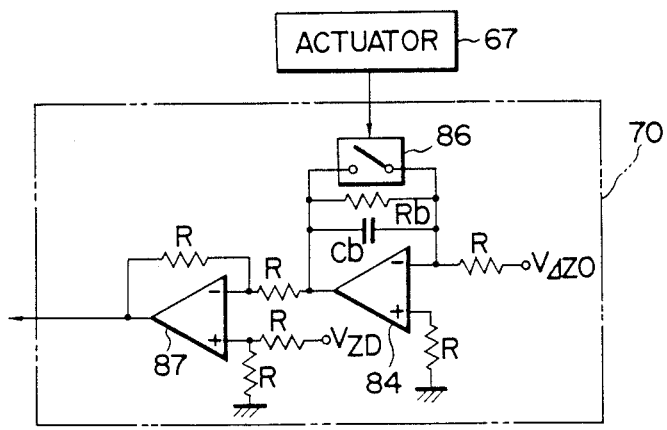
F I G. 9B

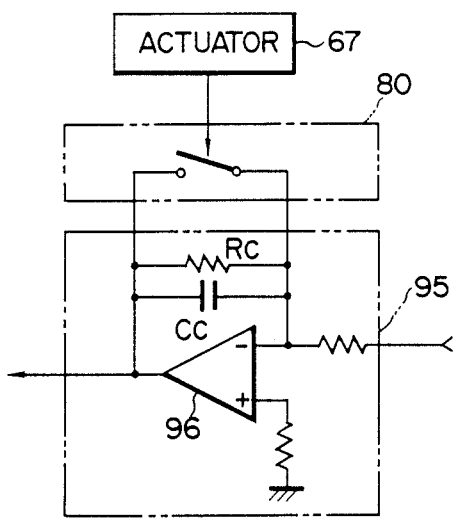
F I G. 12
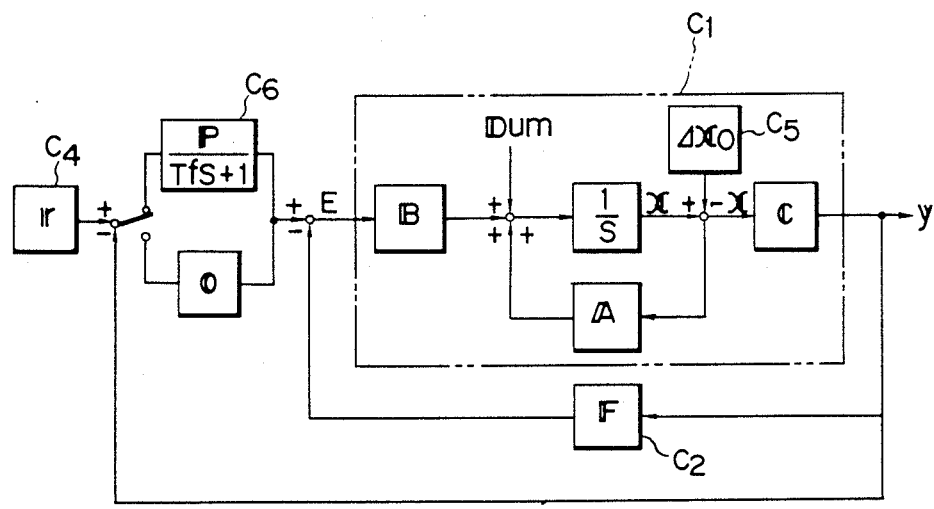
F I G. 13

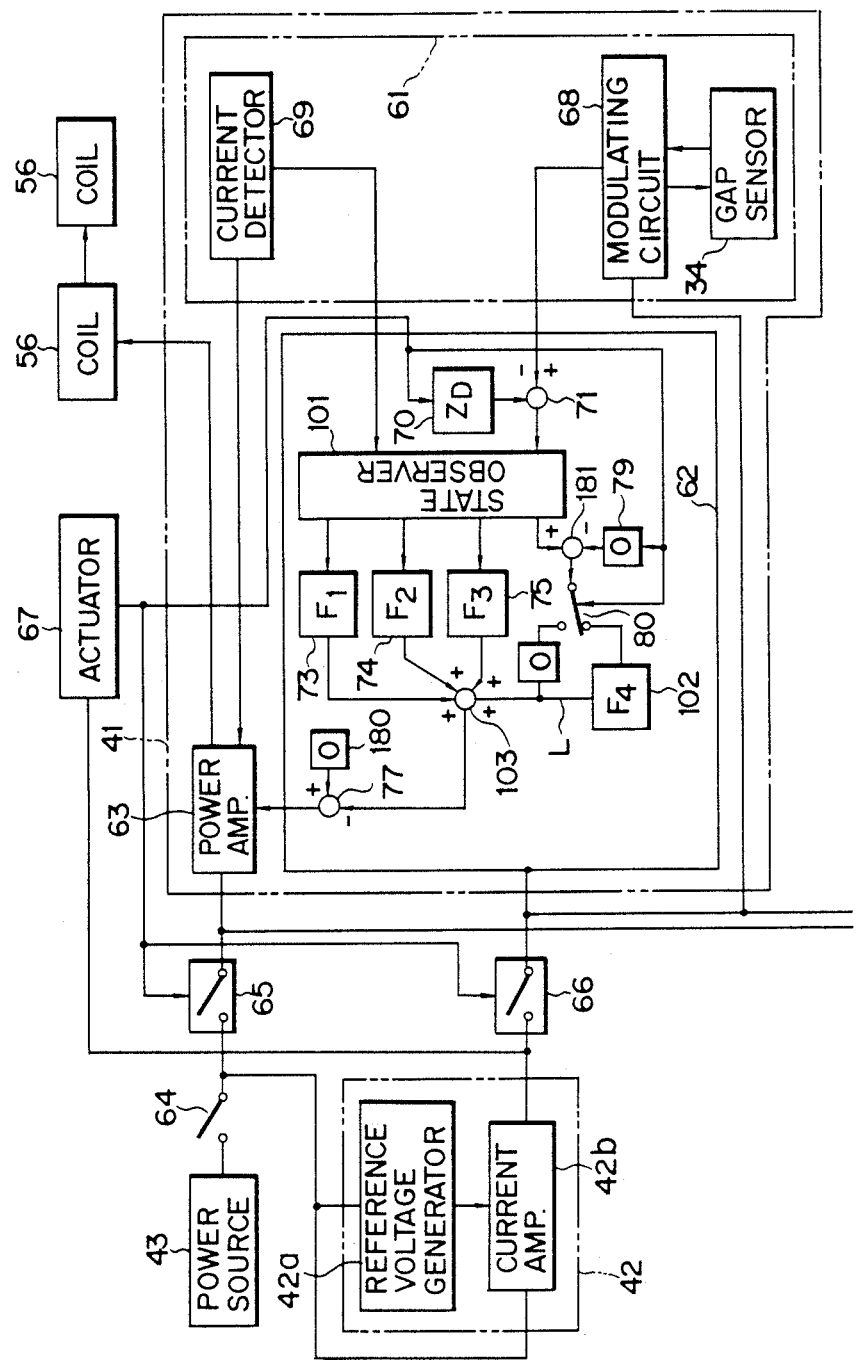
F I G. 14B

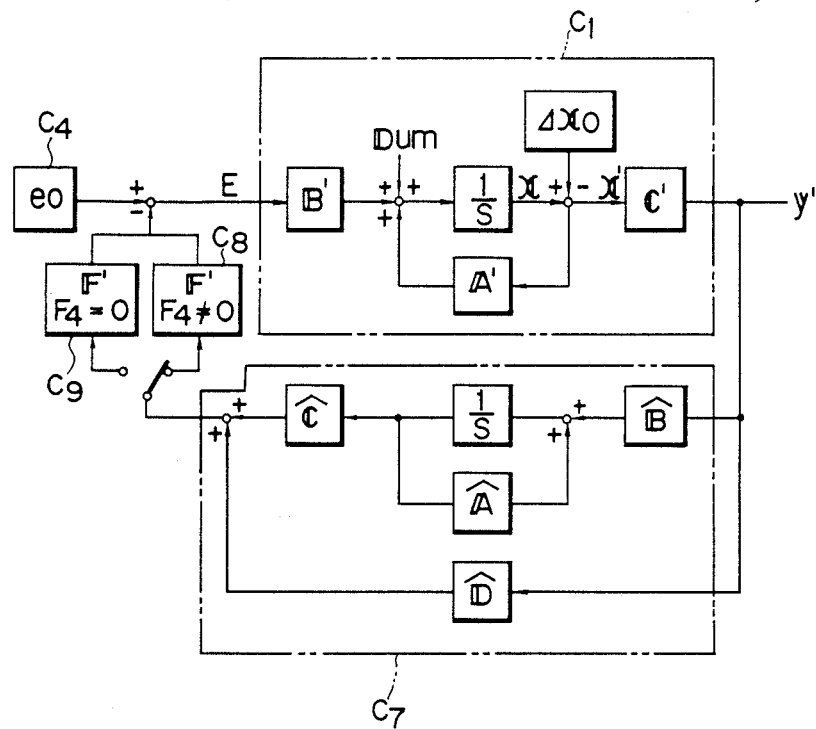
F I G. 15
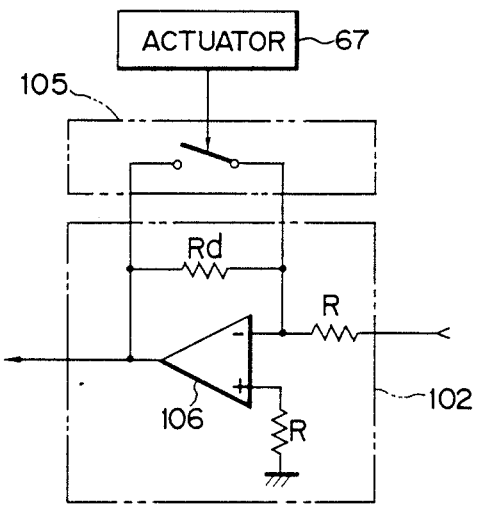
F I G. 16

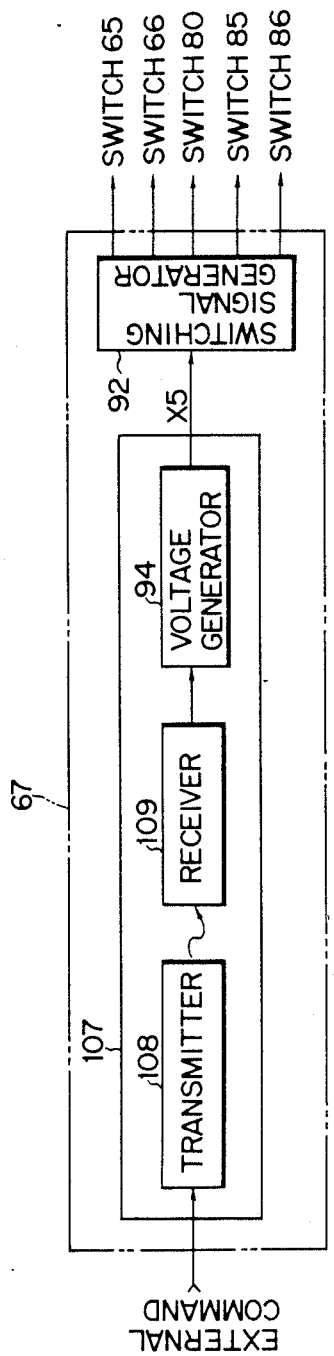
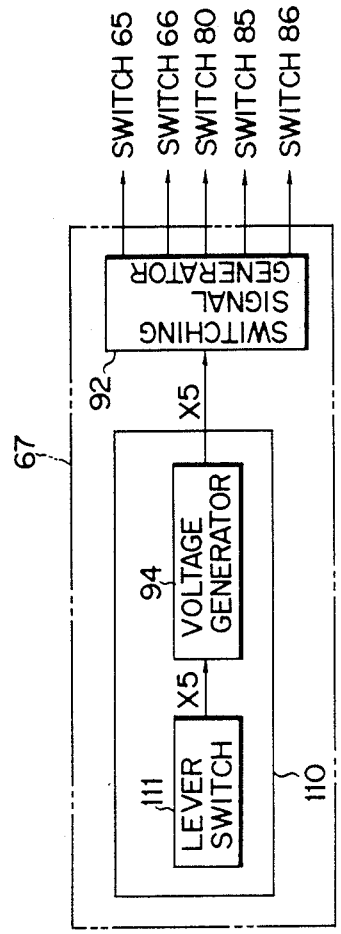
FIG. 17
FIG. 18

TRANSPORTING SYSTEM OF FLOATED CARRIER TYPE

BACKGROUND OF THE INVENTION

The present invention relates to a transporting system of floated carrier type for transporting small cargo and, more particularly, to a transporting system of floated carrier type capable of reducing an impact acting on a carrier itself or cargo loaded thereon when the carrier is ceased to be floated.

As one method of office automation, a carrier system has been recently widely used to transport slips, documents, cash, materials, and the like between a plurality of stations in a building.

A carrier system used for such an application must be able to transport cargo rapidly without noise. For this reason, in a carrier system of this type, a carrier is generally suspended under and transported along guide rails in a noncontacting manner. A system of magnetically suspending or floating a carrier in a noncontacting manner has advantages such as a good following property with respect to guide rails and an effect of preventing noise and dust.

However, in a system wherein a carrier is floated by a magnetic force, when all the magnetic force as a floating force is to be supplied from electromagnets, the electromagnets must always be energized, resulting in a large current consumption. Therefore, the present inventor has proposed a so-called zero power feed-back control system (U.S. Ser. No. 06/726,975, filed Apr. 25, 1985, now abandoned) in which most of the magnetic force, supplied from the electromagnets, is supplied by permanent magnets, thereby reducing the power consumption.

However, in such a magnetic floating system, since a floating carrier is not fixed by a friction force, the carrier may be shaken during cargo loading/unloading at a station, resulting in a difficult loading/unloading operation. In addition, sometimes a floating state of the carrier cannot be maintained due to rolling produced by loading/unloading operation. A stopper may be provided at a station to fix the carrier so that the floating carrier is not shaken. However, such a stopper must not contact the carrier when the carrier simply passes through the station, thereby rendering a mechanism around the station complex in structure.

Therefore, the carrier may be attracted to be fixed on the guide rails or land on auxiliary rails during the loading/unloading operation. However, in a transporting system of floated carrier type adopting zero steady-state power feed-back control (also referred to hereinafter as "zero power feed-back control), an exciting current supplied to a magnetic unit is controlled to be normally zero i.e., zero in the steady-state. Therefore, unlike a conventional magnetic floating control without a zero power feed-back loop, even if a target value of a gap length between the guide rails and the electromagnets is varied, an actual gap length cannot be varied because it is uniquely determined by the weights of the carrier and the cargo. For this reason, in order to, e.g., attract the carrier on the guide rails, power sources of the electromagnets and a control circuit must be turned off during magnetic floating.

However, when the power sources of the electromagnets and the control circuit are turned off during magnetic floating of the carrier, a large impact occurs between the guide or auxiliary rails and the carrier, thereby undesirably destroying the cargo or the carrier or generating dust.

Thus, in the conventional transporting system of floated carrier type adopting zero power feed-back control, the carrier cannot be fixed to the guide rail or released from the guide rail without the large impact between the guide or auxiliary rails and the carrier when the landing or floating of carrier is started, thereby undesirably destroying the cargo or the carrier or generating dust.

SUMMARY OF THE INVENTION

It is, therefore, an object of the present invention to provide a transporting system of floated carrier type capable of reducing an impact acting on a transporting carrier when the carrier is landed on guide rails or is started to be floated thereby protecting the cargo and the carrier and preventing generation of dust.

According to the present invention, there is provided a transporting system for transporting cargo to a predetermined position, comprising:

a carrier for carrying cargo;

at least one rail extending along a running path of the carrier and having a bottom section made of a ferromagnetic material;

floating means including a plurality of magnetic units having respective combinations of permanent magnets and electromagnets provided on the carrier such as to face the rail, the carrier being caused to float with respect to the rail by electromagnetic attractive forces acting between the magnets and the bottom section of the rail;

means, provided on the carrier, for generating an exciting current;

sensing means provided on the carrier for sensing one of a gap between each magnetic unit and the rail and the exciting current to generate an output signal;

means for controlling the exciting current, which includes zero power control means for maintaining the exciting current supplied to the electromagnets to be substantially zero in a stable floating condition in response to output of the sensing means, even when an external force is applied to the carrier; and means for generating a gradually varying target value in accordance with an external command instructing start of floating and landing of the carrier, for deenergizing the zero power control means in response to the external command, and for energizing the controlling means in response to the external command and in accordance with the target value and an output of the sensing means.

BRIEF DESCRIPTION OF THE DRAWINGS

FIG. 2 is a sectional view taken along line II—II of FIG. 1;

FIG. 3 is a sectional view taken along line III—III of FIG. 1;

FIG. 4 is a sectional view of a magnetic unit shown in FIGS. 1 to 3;

FIG. 5 is a block diagram of a conventional magnetic floating system, adapted in a transporting system shown in FIG. 1 and capable of soft start and soft landing;

FIG. 6 is a block diagram of a magnetic floating system, adopted in the transporting system shown in FIG. 1 having zero power control means capable of soft start and soft landing;

FIG. 7 is a block diagram including an electronic circuit and its peripheral circuit of a control system, according to the embodiment of the present invention, for realizing the magnetic floating system shown in FIG. 6;

FIG. 8 is a circuit diagram of an integrating compensator and its peripheral circuit shown in FIG. 7;

FIGS. 9A and 9B are circuit diagrams of a target value generator and its peripheral circuit shown in FIG. 7;

FIG. 12 is a circuit diagram of a filter circuit shown in FIG. 11;

FIG. 13 is a block diagram of a magnetic floating system, in which the circuit shown in FIG. 11 is applied to the transporting system shown in FIG. 7;

FIGS. 14A and 14B are block diagrams including an electronic circuit and its peripheral circuit, respectively, according to still another embodiment of the present invention, and capable of being adapted to the transporting system of the present invention;

FIG. 15 is a block diagram of a control system of a circuit shown in FIG. 14;

FIG. 16 is a circuit diagram of a feed-back gain compensator shown in FIG. 14; and FIGS. 17 and 18 are circuit block diagrams of other examples of an actuator.

DETAILED DESCRIPTION OF THE PREFERRED EMBODIMENTS

Figure 1:
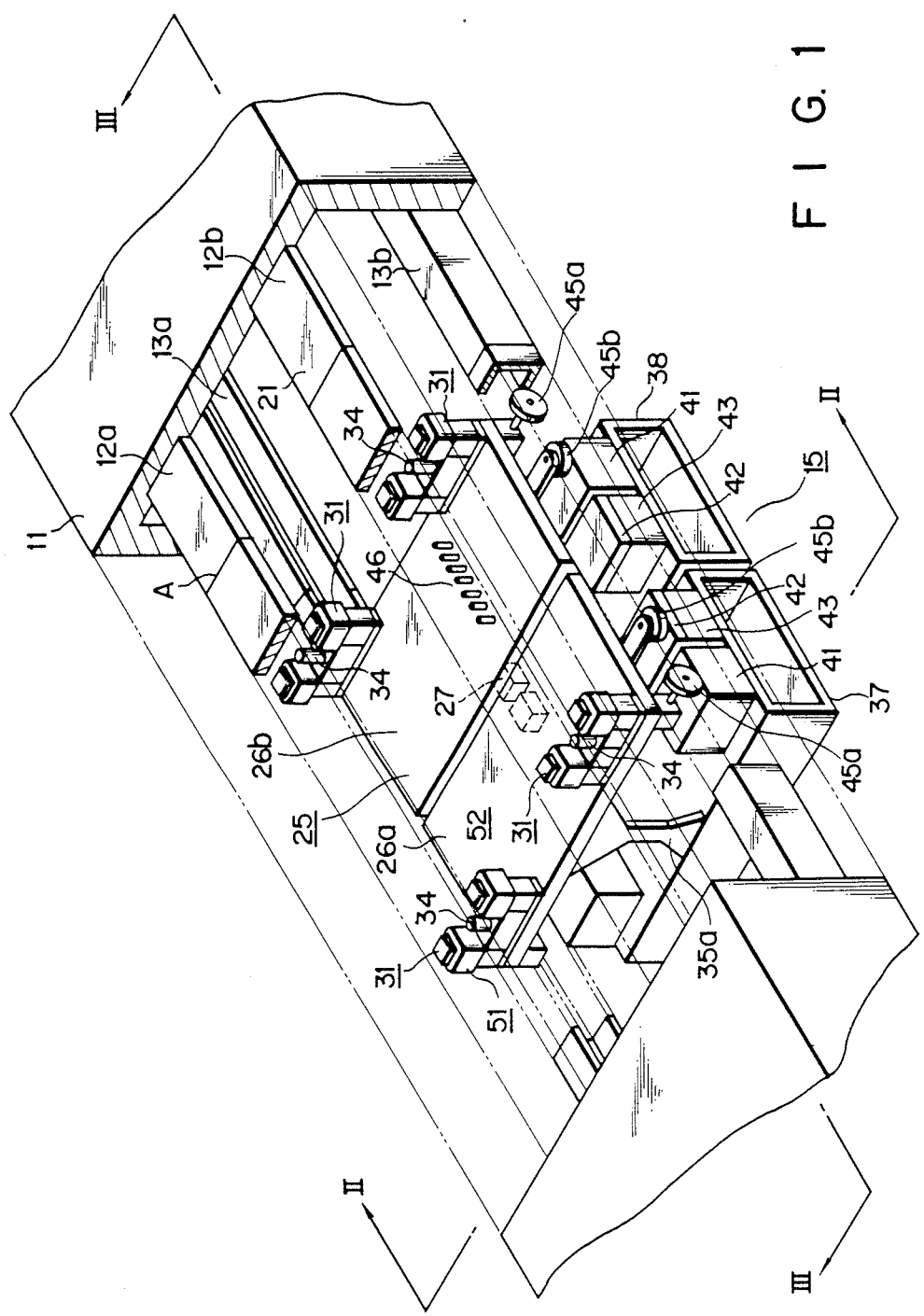
FIG. 1 is a partially cutaway view of a transporting system of floated carrier type according to an embodiment of the present invention.

In FIGS. 1 to 3, reference numeral 11 denotes a guide frame having an inverted U-shaped cross section and so disposed as to avoid obstacles in an office space and the like. Two guide rails 12a and 12b are disposed parallel to each other on the lower surface of an upper wall of frame 11, and emergency rails 13a and 13b each having a U-shaped cross section are disposed on the inner surfaces of side walls of frame 11. Open sides of rails 13a and 13b oppose each other. Carrier 15 is disposed below rails 12a and 12b so as to run along rails 12a and 12b. In addition, stator 16 of a linear induction motor is disposed on the lower surface of the upper wall of frame 11 and between rails 12a and 12b. Stator 16 is disposed along rails 12a and 12b and spaced apart therefrom by a predetermined distance.

Each of the rails 12a and 12b is obtained by painting plate-like member 21 made of a ferromagnetic material in white so as to improve reflection of a light beam from gap sensor 34, and has a split structure for facilitating installation in an office. Joint portion A of member 21 is subjected to predetermined joint processing.

An arrangement of carrier 15 will now be described below. That is, plate-like base 25 is disposed to oppose the lower surfaces of rails 12a and 12b. Base 25 is constituted by split plates 26a and 26b disposed along the running direction, and connecting mechanism 27 for connecting plates 26a and 26b so that plates 26a and 26b can swing in a plane perpendicular to the running direction, i.e., about the running direction. Magnetic floating units 31 are disposed at the four corners of the upper surface of base 25, respectively. Each unit 31 is mounted on the upper surface of base 25 by bolt 32 and seat 33. Optical gap sensor 34 is mounted on unit 31 to detect a gap length between unit 31 and the lower surfaces of rails 12a and 12b. In addition, vessels 37 and 38 for accommodating cargo are mounted on the lower surfaces of plates 26a and 26b through connecting members 35a and 35b, and 36a and 35b, respectively. Each of vessels 37 and 38 has two control units 41 for controlling four units 31, two regulators or constant-voltage generators 42, and two small-capacity power sources 43 for supplying electric power to units 41 and generators 42. In addition, four vertical wheels 45a and for horizontal wheels 45b are disposed at the four corners of the lower surface of base 25, respectively. When units 31 lose their magnetic forces, wheels 45a contact the inner surfaces of upper and lower walls of guides 13a and 13b to support carrier 15 vertically, and wheels 45b contact the inner surfaces of the side walls of guides 13a and 13b to support carrier 15 in the lateral direction. Furthermore, first to seventh phototransistors 46 are disposed at predetermined positions on the upper surface of base 25 to transmit a command from the guide rails to a control system mounted on carrier 15. Phototransistors 46 are so disposed as to oppose 7 LEDs (Light-Emitting Diodes) 47 mounted on the guide frame at a station in a predetermined position. Note that base 25 also serves as a reaction plate as an operation element of the above-mentioned linear induction motor. When the system is in operation, base 25 is so dispsoed as to oppose stator 16 through a slight gap and supplied with a propulsive force therefrom.

Each unit 31 is constituted by two electromagnets 51 and 52 and permanent magnet 53, as shown in FIG. 4. Electromagnets 51 and 52 are disposed along a direction perpendicular to the running direction of carrier 15 so as to oppose the lower end portions of rails 12a and 12b. Permanent magnet 53 is interposed between the lower side surfaces of electromagnets 51 and 52, and has a U shape as a whole. Each of electromagnets 51 and 52 is constituted by yoke 55 made of a ferromagnetic materal, and coil 56 wound around yoke 55. Coils 56 of electromagnets 51 and 52 are connected in series with each other in a direction along with magnetic fluxes generated by electromagnets 51 and 52 are added with each other.

Prior to explanation of units 41, a basic concept of this control system will be described below.

First, a magnetic circuit constituted by unit 31, and its peripheral elements, i.e., rails 12a and 12b, gaps P, yokes 55, and magnet 53 will be described. Note that for the sake of simplicity, a leakage magnetic flux of this magnetic circuit will be neglected. Magnetic reluctance Rm of the magnetic circuit is represented by the following equation (1):

$$Rm = (1/\mu_0 S)(2z + l/\mu_s) \qquad (1)$$

where $\mu_0$ is vacuum permeability; S, a cross-sectional area of the magnetic circuit; z, a gap length; $\mu_s$, nonpermeability of portions excluding the gap; and l, a magnetic circuit length including the gap.

Assuming that the intensity of a magnetic field generated in gaps P when an exciting current does not flow through coils 56 is Hm, that the length of magnet 53 is lm, that the total number of turns of coils 56 is N, and that the exciting current supplied to coils 56 is I, total magnetic flux $\phi$ generated in the magnetic circuit is:

$$\phi = (NI + Hmlm)/Rm \tag{2}$$

Therefore, total attractive force F acting between rails 12a and 12b and yokes 55 is represented by the following equation (3):

$$F = -(S/\mu_0)(\phi/S)^2 = (NI + Hmlm)^2/\mu_0 Rm^2 S \tag{3}$$

Assuming that a direction represented by z is a gravity direction as shown in FIG. 4, an equation of motion is obtained as follows:

$$m(d^2z/dt^2) = -(NI + Hmlm)^2/\mu_0 Rm^2 S + mg + Um \tag{4}$$

where m is a total mass of a load acting on the magnetic floating portion and the magnetic floating portion; g, acceleration of gravity; and Um, an external force acting on the carrier.

On the other hand, interlinked magnetic flux number $\phi_N$ of coils 56 connected in series with each other is:

$$\phi_N = (NI + Hmlm)N/Rm \tag{5}$$

Therefore, a voltage equation of coils 56 is obtained as follows assuming that a total resistance of coils 56 is R:

$$d\phi_N/dt = E - RI$$

$$(\delta\phi_N/\delta I)(dI/dt) + (\delta\phi_N/\delta z)(dz/dt) = E - RI$$

$$(N^2/Rm)(dI/dt) - (2N/\mu_0 SRm^2)(Ni + Hmlm)(dz/dt)$$

$$= E - RI$$

Therefore, $$(N^2/Rm)(dI/dt) + RI = (2N/\mu_0 SRm^2) \cdot (NI + Hmlm)(dz/dt) + E \tag{6}$$

As is apparent from equation (1), RM is a function of gap length z. Therefore, assuming that the gap length is $z_0$ and the total magnetic reluctance is $Rm_0$ when attractive force F and gravity mg are balanced with each other for I=0, equations (4) and (6) are linearized around gap length $z=z_0$, speed dz/dt=0, and current I=0. In this case, z, dz/dt, and I are respectively represented as follows assuming that their micro amounts are $\Delta z$, $\Delta \dot{z}$, and $\Delta i$, respectively:

$$z = z_0 + \Delta z$$

$$dz/dt = 0 + \Delta \dot{z}$$

$$I = 0 + \Delta i$$

Therefore, attractive force F of equation (4) is linearized around steady point (z, dz/dt, I) = ($z_0$, 0, 0) to obtain the following equation:

$$F = (F)_{(z_0,0,0)} + (\delta F/\delta z)_{(z_0,0,0)} \Delta z$$

$$+ (\delta F/\delta I)_{(z_0,0,0)} \Delta i$$

$$= -\mu_0 SHm^2m^2/(2z_0 + l/\mu_s)^2 + \{4\mu_0 SHm^2lm^2/(2z_0 + l/\mu_s)^3\}\Delta z - 2\mu_0 SHmlmN/(2z_0 + l/\mu_s)^2 \Delta i$$

Substitution of $$F_0 = \mu_0 SHm^2lm^2/(2z_0 + l/\mu_s)^2 = mg$$

into the above equation yields the following equation:

$$F = -mg + (4mg/Rm_0)\Delta z - (2Nmg/Hmlm)\Delta i$$

As a result, equation (4) can be summarized as follows:

$$\Delta \ddot{z} = (4g/\mu_0 Rm_0 S)\Delta z - (2gN/Hmlm)\Delta i + (1/m)Um \tag{7}$$

Similarly, equation (6) is linearized around steady point (z, dz/dt, I) = ($z_0$, 0, 0) to obtain the following equation (8):

$$\Delta \dot{i} = (2Hmlm/N\mu_0 Rm_0 S)\Delta \dot{z} - \{R(Hmlm)^2/N^2 mg\mu_0 Rm_0 S\}\Delta i + \{(Hmlm)^2/N^2 mg\mu_0 Rm_0 S\}E \tag{8}$$

Equations (7) and (8) can be summarized as the following equation of state:

$$(d/dt)\begin{pmatrix}\Delta z \\ \Delta \dot{z} \\ \Delta i\end{pmatrix} = \begin{pmatrix}0 & 1 & 0 \\ a_{21} & 0 & a_{23} \\ 0 & a_{32} & a_{32}\end{pmatrix}\begin{pmatrix}\Delta z \\ \Delta \dot{z} \\ \Delta i\end{pmatrix} + \begin{pmatrix}0 \\ 0 \\ b_{31}\end{pmatrix}E + \begin{pmatrix}0 \\ d_{21} \\ 0\end{pmatrix}Um \tag{9}$$

where $a_{21}$, $a_{23}$, $a_{32}$, $a_{33}$, $b_{31}$, and $d_{21}$ are respectively
$a_{21} = 4g/\mu_0 Rm_0 S$, $a_{23} = -2gN/Hmlm$,
$a_{32} = 2Hmlm/N\mu_0 Rm_0 S$,
$a_{33} = -R(Hmlm)^2/N^2 mg\mu_0 Rm_0 S$,
$b_{31} = (Hmlm)^2/N^2 mg\mu_0 Rm_0 S$, and $d_{21} = 1/m$.

For the sake of simplicity, equation (9) is represented by following equation (10):

$$\dot{X} = AX + BE + DUm \tag{10}$$

A linear system represented by equation (9) is generally an unstable system. However, when applied voltage E is determined by various methods in accordance with state vector [$\Delta z$, $\Delta \dot{z}$, $\Delta i$] and acceleration $\Delta \ddot{z}$ of equation (9) and a feed-back control is performed to the system, the system can be stabilized. For example, assuming that C is an output matrix (in this case, a unit matrix), and that $X' = X - \Delta X_0$ and $\Delta X_0 = [\Delta Z_0, 0, 0]$, voltage E is represented by following equation (11):

$$E = -[F_1, F_2, F_3] \times C \times X' + e_0 = -FCX' + e_0 \tag{11}$$

Assuming that $F_1$, $F_2$, and $F_3$ are feed-back constants; $\Delta Z_0$, deivation ($\Delta Z_0 = Z_D - Z_0$) between target value $Z_D$ and gap length $Z_0$ of the gap length; and $e_0$, an added voltage, equation (10) yields following equation (12):

$$\dot{X} = AX - BFC(X - \Delta X_0) + DUm + Be_0 \tag{12}$$

Equation (10) is further Laplace-transformed to solve for X as follows:

$$X = a^{-1}\{[sI - A + BFC]^{-1}(X_0 + DUm(s) + BFC\Delta x_0(s) + Be_0(s)\} \tag{13}$$

where I is a unit matrix, and $X_0$ is an initial value of X.

In accordance with equation (13), state transition matrix $\phi(s)$, that is:

$$\phi(s) = (SI - A + BFC)^{-1} \tag{14}$$

is used to represent transfer functions G(s), H(s), and P(s) of X(s) with respect to Um, $\Delta Z_0$ and $e_0$ respectively as follows:

$$G(s) = \phi(s)D \tag{15}$$

$$= (d_{21}/\Delta_3(s)) \begin{pmatrix} s + (b_{31}F_3 - a_{33}) \\ s^2 + (b_{31}F_3 - a_{33})s - \\ (b_{31}F_2 - a_{32})s + b_{31}F_1 \end{pmatrix}$$

$$H(s) = \phi(s)BFC \tag{16}$$

$$= (b_{31}F_1/\Delta_3(s)) \begin{pmatrix} a_{23} \\ a_{23}s \\ s^2 - a_{21} \end{pmatrix}$$

$$P(s) = \phi(s)B \tag{17}$$

$$= (b_{31}/\Delta_3(s)) \begin{pmatrix} a_{23} \\ a_{23}s \\ s^2 - a_{21} \end{pmatrix}$$

where $$\Delta_3(s) = s^3 + (b_{31}F_3 - a_{33})s^2 + \{-a_{21} + a_{23}(b_{31}F_2 - a_{32})\}s + a_{23}b_{31}F_1 - a_{21}(b_{31}F_3 - a_{33})$$

A characteristic equation of $\phi(s)$ can be obtained by $\Delta_3(s) = 0$. Therefore, by determining the values of $F_1$, $F_2$, and $F_3$, the characteristic root of $\phi(s)$ is arbitrarily located on a left half of a complex plane to achieve stabilization of the magnetic floating system. FIG. 5 is a block diagram of the magnetic floating system when such feed-back control for the magnetic floating unit is performed. That is, feed-back gain compensator $C_2$ is added to object $C_1$ to be controlled. Note that in FIG. 5, y represents CX.

In such a magnetic floating system, as is apparent from equations (15) to (17), a steady deviation is generated in gap length deviation $\Delta z$ and current deviation $\Delta i$ during a stable state of the system along with changes in step-like external force Um, and target value $Z_D$ and added voltage $e_0$ of the gap length change. Therefore, by gradually varying value $Z_D$ and voltage $e_0$ of the gap length, the value of steady deviation of the gap length can be varied and finally carrier 15 can be fixed on upper or lower portions of the inner walls of guides 13a and 13b.

In a system according to the present invention, units 31 are subjected to the feed-back control so as to set the steady deviation of current to be zero regardless of the presence/absence of step-like external force Um.

In order to realize the above described feed-back control, the following control methods had been proposed in U.S. Ser. No. 726,975, filed Apr. 25, 1985:

① A method in which force Um is observed by a state observer, and observed value Um is multiplied with a proper gain and then fed back to the magnetic floating system.

② A method in which gap length deviation $\Delta z$, speed deviation $\Delta \dot{z}$, and current deviation $\Delta i$ are all multiplied with proper gains which are not zero at the same time, and then the respective values are fed back to the magnetic floating system through a filter constituting a primary system of s.

③ A method in which current deviation $\Delta i$ is integrated by an integrating compensator, and an output value therefrom is multiplied with a proper gain and then fed back to the magnetic floating system.

These means for realizing feed-back are called a zero power feed-back loop.

Method ③ is used in an example described hereinafter to explain a method of varying the steady deviation of the gap length and a method of finally fixing the carrier.

FIG. 6 is a block diagram of the magnetic floating system adopting method ③. That is, according to the above method, the system includes, in addition to compensator $C_2$, integrating compensator $C_3$, target value generators $C_4$ and $C_5$, and a means for arbitrarily disabling compensator $C_3$. Gain K of compensator $C_3$ and target value r of generator $C_4$ are represented by $K=[O,O,K_3]$ and $r=[O,O,r_3]^T$, respectively, where $K_3$ is an integrating gain of current deviation $\Delta i$ and $r_3$ is an exciting current target value. Therefore, applied voltage E of this magnetic floating system is represented by the following equation (18):

$$E = -FCX - KC \int_0^t Xdt + Be_0 + K \int_0^t rdt \tag{18}$$

Similar to the above-mentioned case, state transition matrix $\phi(s)$ is obtained as follows:

$$\phi(s) = (s^2I - sA + sBFC + BKC)^{-1} \tag{19}$$

Assuming that Um, $\Delta Z_0$, e, and $r_3$ are inputs and y represented by $y = CX$ is an output, transfer functions G(s), H(s), P(s), and Q(s) are respectively represented as follows:

$$G(s) = s\phi(s)D \tag{20}$$

$$= (1/\Delta_4(s)) \begin{pmatrix} \{s^2 + (b_{31}F_3 - a_{33})s + b_{31}K_3\}d_{21} \\ \{s^2 + (b_{31}F_3 - a_{33})s + b_{31}K_3\}sd_{21} \\ \{-(b_{31}F_2 - a_{32})s + b_{31}F_1\}sd_{21} \end{pmatrix}$$

$$H(s) = \phi(s)B(sF + K) \tag{21}$$

$$= (b_{31}F_1s/\Delta_4(s)) \begin{pmatrix} a_{23} \\ a_{23}s \\ s^2 - a_{21} \end{pmatrix}$$

$$P(s) = \phi(s)Bs \tag{22}$$

$$= (b_{31}s/\Delta_4(s)) \begin{pmatrix} a_{23} \\ a_{23}s \\ s^2 - a_{21} \end{pmatrix}$$

$$Q(s) = \phi(s)BK \tag{23}$$

$$= (K_3b_{31}/\Delta_4(s)) \begin{pmatrix} a_{23} \\ a_{23}s \\ s^2 - a_{21} \end{pmatrix}$$

where $$\Delta_4(s) = s^4 + (b_{31}F_3 - a_{33})s^3 + \{b_{31}K_3 - a_{21} + a_{23}(b_{31}F_2 -$$

$$a_{32})\}s^2 + \{a_{23}b_{31}F_1 - a_{21}(b_{31}F_3 - a_{33})\}s -$$

$$a_{21}b_{31}K_3 \qquad (24)$$

Characteristic roots of functions G(s), H(s), P(s), and Q(s) can be obtained when $\Delta_4(s)$ given by equation (24) is 0, and the magnetic floating system of FIG. 6 can be stabilized by determining $F_1$, $F_2$, $F_3$, and $F_4$.

Assuming that the magnetic floating system of FIG. 6 is stable and $Z_0$, $e_0$, and $r_3$ are simultaneously zero, a response of current deviation $\Delta i$ with respect to external force Um can be obtained as follows using Laplace transform:

$$\Delta i(s) = -(d_{21}/\Delta(s))\{(b_{31}F_2 - a_{32})s + b_{31}F_1\}sUm(s) \qquad (25)$$

Since force Um is a step-like external force in equation (25), $Um(s) = F_0/s$ assuming that $F_0$ is the magnitude of the external force. Therefore, equation (25) yields following equation (26):

$$\Delta i(s) = -(d_{21}/\Delta(s))\{(b_{31}F_2 - a_{32})s + b_{31}F_1\}F_0 \qquad (26)$$

Since equation (26) guarantees $$\lim_{t \to \infty} \Delta i \to 0,$$

it is apparent that a means for setting the steady deviation of current near zero regardless of the presence/absence of external force Um is actually present. However, in this magnetic floating system, as is apparent from equations (21) to (23), the steady deviation of gap length cannot be varied unless target value $r_3$ of the exciting current is varied. Therefore, the carrier cannot be finally fixed on the guide rails.

Note that examples of methods of obtaining elements of state vector X are as follows:

① A method in which all the elements are measured directly by a proper sensor.

② method in which a proper one of output signals from a gap sensor, a speed sensor, an acceleration sensor, and the like is integrated or differentiated as needed by an integrator or a differentiator, thereby detecting $\Delta z$, $\Delta \dot{z}$, and the like.

③ A method in which two elements of the state vector are detected by method ① or ②, and the remaining element is observed as needed together with external force Um by a state observer.

In this embodiment, control is performed such that exciting current target value $r_3$ is gradually varied from zero to a predetermined value only when the floating carrier is to be fixed on the guide rails. In this case, soft landing of the carrier can be realized without abruptly stopping zero power feed-back.

On the other hand, the above method is not used when the carrier fixed on the guide rails is to be softly floated. This is because when carrier 15 is attracted and fixed on rails 12a and 12b or rails 13a and 13b, the control unit 41 is operated as if a counter force with respect to carrier 15 from rails 12a and 12b or rails 13a and 13b is an external force acting on carrier 15, thereby disabling start of floating of carrier 15. In this case, an operation of the zero power feed-back loop is stopped, and carrier 15 is gradually floated by gradually varying gap length target value $Z_D$ or added voltage $e_0$ from a predetermined value to another value as described above. Immediately after that, the operation of the zero power feed-back loop may be started.

In accordance with the above description, an electrical arrangement of the system including units 41 has an arrangement shown in FIG. 7. Unit 41 is constituted by sensor section 61 for detecting a magnetomotive force and magnetic reluctance generated in the magnetic circuit by units 31, and changes in motion of carrier 15, operation circuit 62 for calculating electric power to be supplied to coils 56 in accordance with a signal from section 61, and power amplifier 63 for supplying electric power to coils 56 in accordance with a signal from circuit 62. Electric power from source 43 is supplied to amplifier 63 through main switch 64 and switch 65. Electric power from source 43 is also supplied to circuit 62 and section 61 through switch 64, generator 42, and switch 66. Generator 42 is constituted by reference voltage generator 42a and current amplifier 42b, and outputs a constant voltage. The constant voltage from generator 42 is also supplied to actuator 67. Outputs from actuator 67 are supplied as command signals to switches 65 and 66, and circuit 62.

Sensor section 61 is constituted by modulating circuit 68 for modulating a signal from sensor 34 so as to surpress an effect of external noise, and current detector 69 for detecting a current value of coils 56.

Operation circuit 62 realizes the feed-back magnetic floating system in FIG. 6. First, gap length set value $Z_D$ from generator 70 is subtracted from a gap length detected by sensor 34 by subtracter 71. Outputs from subtracter 71 are supplied to feed-back gain compensators 73 and 74 directly and through differentiator 72, respectively. In addition, a current detection signal from detector 69 is supplied to feed-back gain compensator 75. Compensated outputs from compensators 73 to 75 are added by adder 76 and the sum is then supplied to one input terminal of subtracter 77. The current detection signal is compared with a current target value ("0" in a floating control state) from target value generator 79 in subtracter 78. A comparison result is supplied to integrating compensator 81 through switch unit 80, integration-compensated therein, and then supplied to the other input terminal of subtracter 77. Then, the output from subtracter 77 is used for gain adjustment of amplifier 63. Therefore, zero power feed-back loop L consisting of subtracter 78, compensator 81 and subtracter 77 is constituted.

Note that switch unit 80 serves to selectively stop function of compensator 81 in accordance with a command from actuator 67. As shown in FIG. 8, unit 80 may be arranged such that capacitor C, connected between the input and output terminals of operation amplifier 82 constituting compensator 81, is short-circuited in accordance with an output from actuator 67. With this arrangement, gain $K_3 = -1/RC$ of compensator 81 becomes 0 in accordance with the output from actuator 67, and the output from amplifier 82 also becomes 0.

In addition, generators 70 and 79 vary their target values in accordance with the output from actuator 67. Generators 70 and 79 may be constituted as shown in FIGS. 9A and 9B, respectively. That is, generator 70 is constituted such that switch 86 is provided between the input and output terminals of a filter constituting a primary delay system consisting of amplifier 84, resistor Rb, and capacitor Cb. Generator 79 is similarly constituted such that switch 85 is provided between the input and output terminals of a filter constituting a primary delay system consisting of amplifier 83, resistor Ra, and capacitor Ca. Switches 85 and 86 are opened/closed in accordance with the output from actuator 67. Generators 70 and 79 receive predetermined input values $V_{I0}$, $V_{\Delta Z0}$, and $V_{ZD}$. When switches 85 and 86 are switched from closed to open states, generators 70 and 79 output target values gradually varying from the predetermined value to other values.

Figure 10:
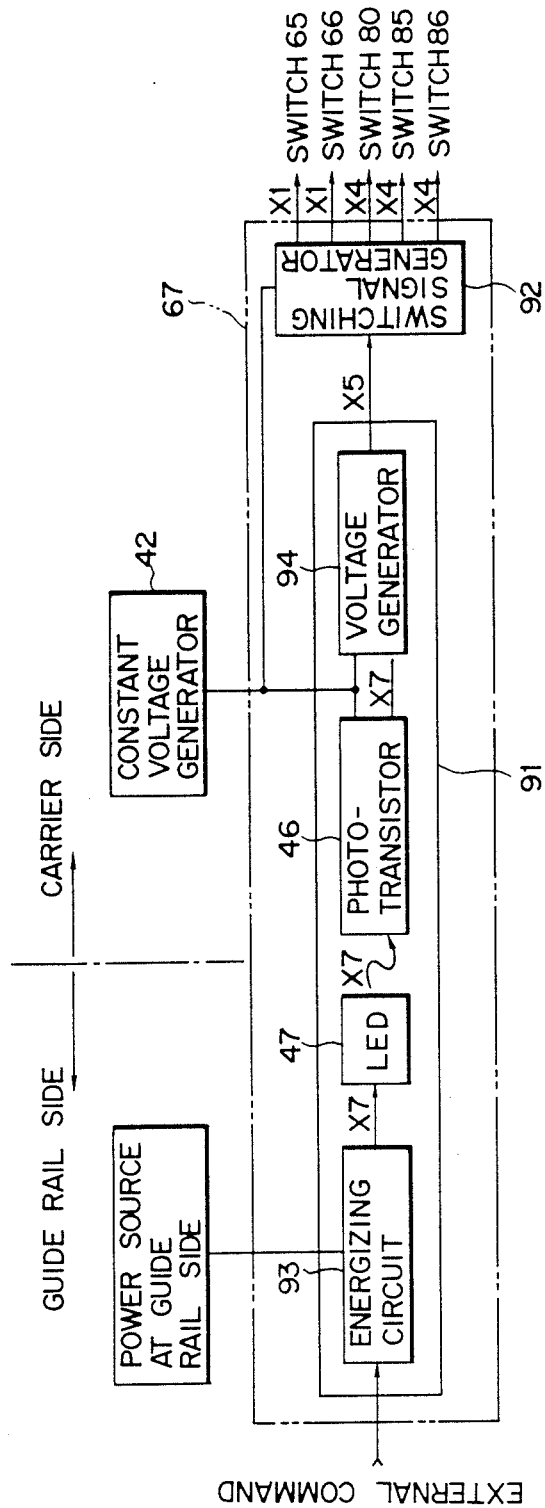
FIG. 10 is a block diagram of a circuit of an actuator shown in FIG. 7.

Actuator 67 is constituted by external command converter 91 and switching signal generator 92, as shown in FIG. 10. Converter 91 is constituted by energizing circuit 93 for supplying an exciting current to the seven LEDs 47 in a guide rail side to drive LEDs 47 mounted on frame 11 in accordance with the external command, LEDs 47 mounted on frame 11, seven photo-transistors 46 connected to constant-voltage generator 42 and mounted in positions corresponding to LEDs 47 of carrier 15 at a station, and voltage generator 94 for outputting a binary-value voltage in accordance with outputs from central five phototransistors 46. In addition, generator 92 connected to constant-voltage generator 42 converts a 5-bit output from converter 91 into switching signals for opening/closing switches 65, 66, 80, 85, and 86, and supplies them to the corresponding switches, thereby controlling open/closed states of the switches. Note that the output from the remaining two phototransistors 46 arranged at both sides serve to detect whether LEDs 47 and phototransistors 46 properly oppose each other. Only when these two phototransistors 46 receive light beams from LEDs 47 at the same time, the external command is transmitted from the guide rails to the carrier. For this reason, erroneous transmission of the external command caused when the carrier does not stop at a correct position can be prevented.

An operation of the transporting system of floated carrier type according to the embodiment of the present invention will be described below.

In this embodiment, when the system is not operated, vertical wheels 45a of carrier 15 are brought into contact with the inner wall upper surfaces of rails 13a and 13b by an attractive force of magnet 53, switches 65 and 66 are opened, and switches 80, 85, and 86 are closed.

In this state, when switch 64 is turned on, actuator 67 located at carrier side is actuated by generator 42, and a command is output so as to close switch 66, and unit 41 starts operation.

When a command is output so as to close switch 65 and to open switch 86, control is performed such that target value $Z_D$ of the gap length is gradually increased in a state wherein an operation of zero power feed-back loop L is stopped, i.e., in the floating system shown in FIG. 5. As a result, unit 41 causes electromagnets 51 and 52 to generate a magnetic flux in a direction opposite to that of the magnetic flux generated by magnet 53, and controls a current to be flowed through coils 56 so as to generate a predetermined gap between units 31 and rails 12a and 12b. Therefore, as shown in FIG. 4, a magnetic circuit formed by a loop of magnet 53, yoke 55, gap P, rails 12a and 12b, gap P, yoke 55, and magnet 53, so that carrier 15 softly starts floating. At this time, if the external command is output so as to open switch 80, loop L starts operation, and the magnetic circuit maintains predetermined gap length $z_0$ so that carrier 15 obtains a magnetic attractive force not requiring the magnetic flux generated by electromagnets 51 and 52 at all in a steady state wherein no external force acts on carrier 15.

When external force Um is applied in this state, sensor 34 detects this and transmits a detection signal to circuit 62 through circuit 68. Circuit 62 subtracts gap length target value $x_D$ from the detection signal by subtracter 71, thereby calculating gap length deviation signal $\Delta z - \Delta z_0$. Signal $\Delta z - \Delta z_{0\,L}$ is input to compensator 73, and converted into speed deviation signal $\Delta z$ by differentiator 72, which is input to compensator 74. On the other hand, current deviation signal $\Delta i$ is obtained by a measurement signal of detector 69, and input to compensator 75. Signal $\Delta i$ is compared with a zero level as an output from generator 79 by subtracter 78, and its difference signal is input to compensator 81. Output signals from three compensators 73 to 75 added with each other by adder 76 and the signal from compensator 81 are respectively multiplied with predetermined gains and fed back to amplifier 63. Thus, the system is stabilized in a state wherein signal $\Delta i$ becomes zero.

Assuming that carrier 15 is placed immediately below stator 16 of the linear induction motor and stator 16 is energized, base 25 is subjected to an electromagnetic force from stator 16, and carrier 15 starts running along rails 12a and 12b while maintaining a magnetic floating state. If stator 16 is arranged before a position at which carrier 15 is completely stopped by an effect of air resistance and the like, carrier 15 is energized again to continuously move along rails 12a and 12b. This movement continues to a destination. Thus, carrier 15 can be moved to a destination in a noncontacting state.

When the external command for opening switch 85 is supplied to actuator 67 of carrier 15 which has arrived at the destination, i.e., a station, the output from generator 79 gradually varies from the zero level to the predetemined value, and gap length Z is gradually decreased. Wheels 45a of carrier 15 are finally brought into contact with the inner wall upper surfaces of rails 13a and 13b. At this time, if a command is output so as to open switch 65 and close switches 80, 85, and 86, power supply to electromagnets 51 and 52 is stopped, carrier 15 is attracted and fixed on rails 13a and 13b by the attractive force of magnet 53, and the operation of loop L and internal states of generators 70 and 79 are reset for the next floating. Thereafter, if it is necessary to start carrier 15 toward another destination, a command may be output to close switch 65 and open switch 86, thereby repeating the above-mentioned procedure.

On the other hand, when carrier 15 is to be attracted and fixed at the destination for a long period of time, an external command may be output to open switch 66, thereby saving the electric power consumed by unit 41. In addition, when switch 64 is opened after that, the operation of the system can be completely stopped.

Note that the present invention is not limited to the above embodiment. For example, in the above embodiment, actuator 67 and generators 70 and 79 are so arranged as to adopt a method in which current deviation $\Delta i$ is integrated by an integrating compensator, multiplied with a proper gain, and then fed back. However, they may have an arrangement suitable for the other methods described above.

Figure 11:
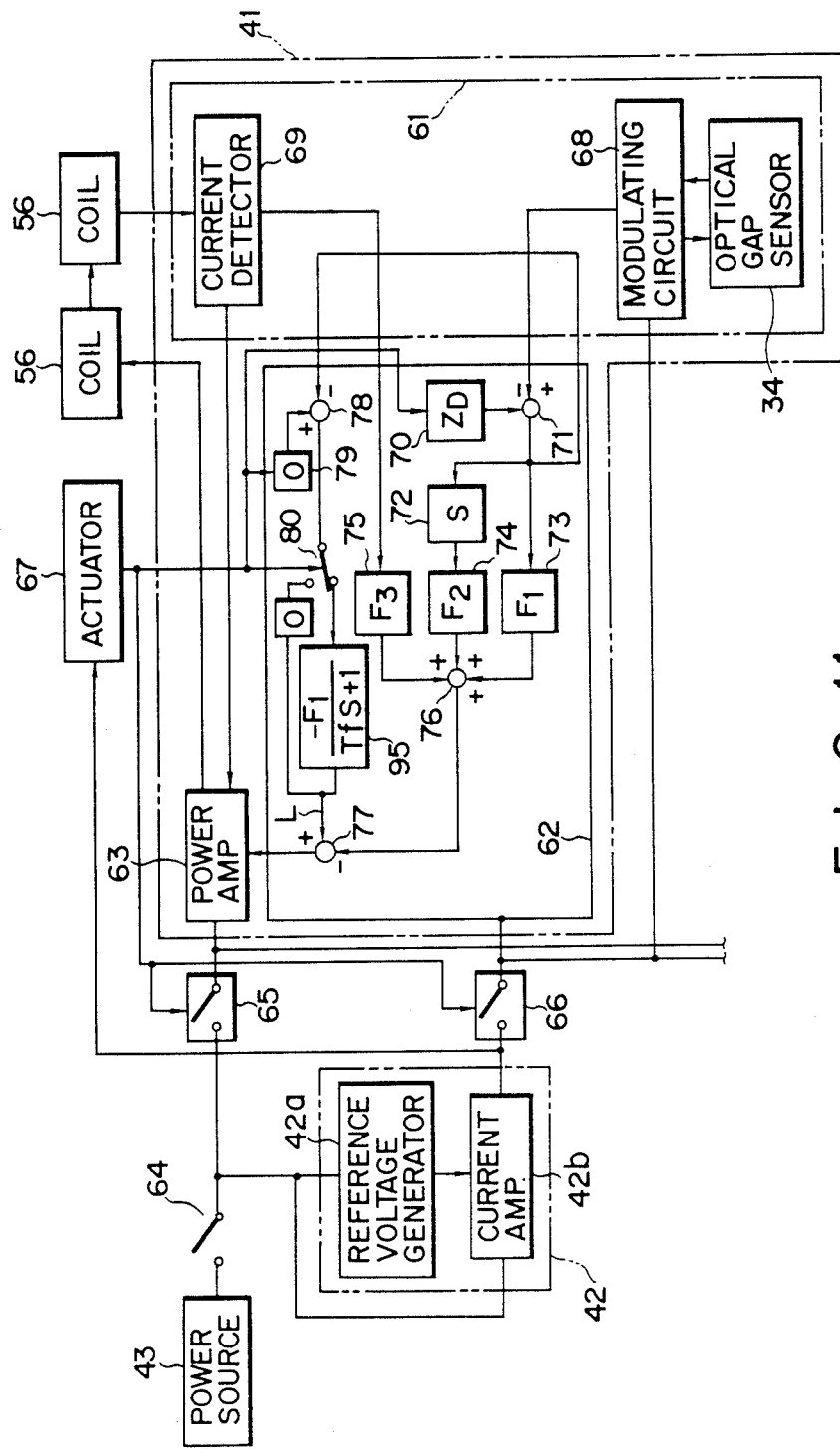
FIG. 11 is a block diagram including an electronic circuit and its peripheral circuit, according to another embodiment of the present invention, and capable of being adapted to the transporting system of the present invention.

For example, FIG. 11 shows an embodiment in which compensator 81 of FIG. 7 is replaced with filter 95 having a primary transfer function. Assuming that a time constant of filter 95 is Tf, its transfer function is defined as follows:

$$Gf(s) = -F_1/(T_f S + 1)$$

In addition, in the FIG. 7 embodiment, the output signal from detector 69 is supplied as an input to subtracter 78. However, in FIG. 11 embodiment, the output from subtractor 71 is supplied as an input to subtracter 78. Filter 95 is constituted such that capacitor Cc and resistor Re are connected in parallel with each other between the input and output terminals of operation amplifier 96, as shown in FIG. 12. Also in this cse, when both ends of capacitor Cc and resistor Re are short-circuited by switch 80, zero power feed-back loop L is deenergized.

According to this method, in an existing magnetic floating system adopting a control method shown in FIG. 5, loop L can be added while maintaining a sufficiently stable magnetic floating state by setting a large value of Tf without calculating feed-back gain $F=[F_1, F_2, F_3]$ again. Assuming that $P=[-F_1, 0, 0]$ and $r=[r_1, 0, 0]^T$, its block diagram is shwon in FIG. 13.

Figure 14A:
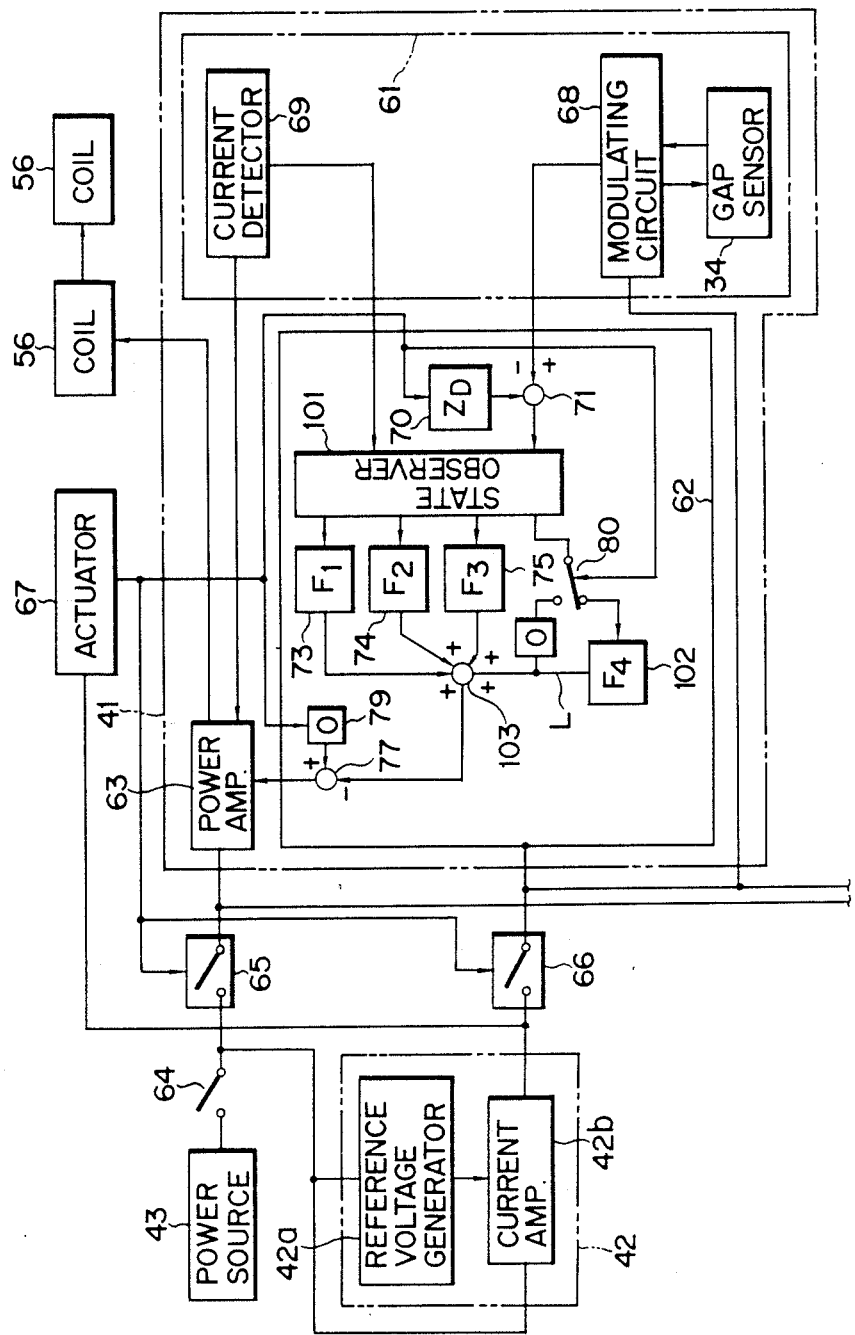

FIGS. 14A and 14B show a control method using state observer 101. In FIG. 14A, observer 101 receives output signals from subtracter 71 and detector 69, detects speed $\Delta z$ corresponding to the output signal from differentiator 72 in the above-mentioned embodiment and a steady component of external force Um acting on carrier 15, and outputs a gap length deviation signal, a speed signal, a current deviation signal, and an external steady component signal to compensators 73, 74, 75, and 102. Four compensators 73 to 75 and 102 multiply the inputs by gains $F_1$, $F_2$, $F_3$, and $F_4$, respectively, and output the products. After these outputs are added by adder 103, the sum is compared with a O signal as an output from generator 79 and is then output to amplifier 63. Note that $F_4 = +(d_{21}/a_{21})F_1$. FIG. 15 is a block diagram of this control system, in which observer 101 is denoted by $C_7$. In FIG. 15, respective symbols are represented by the following equations:

$$\hat{A} = \begin{bmatrix} -a_{11} & d_{21} \\ -a_{21} & 0 \end{bmatrix}, \hat{B} = \begin{bmatrix} a_{21} + d_{21}\alpha_{21} - \alpha_{11}^2 & a_{23} \\ -a_{11}\alpha_{21} & 0 \end{bmatrix}$$

$$\hat{C} = \begin{bmatrix} 0 & 1 & 0 & 0 \\ 0 & 0 & 0 & 1 \end{bmatrix}^T, \hat{D} = \begin{bmatrix} 1 & \alpha_{11} & 0 & \alpha_{21} \\ 0 & 0 & 1 & 0 \end{bmatrix}^T$$

$$C' = \begin{bmatrix} 1 & 0 & 0 \\ 0 & 0 & 1 \end{bmatrix}, F = [F_1 F_2 F_3 F_4]$$

$$y' = [\Delta z, \Delta i]^T$$

where $\alpha_{11}$ and $\alpha_{21}$ are constants which can be determined so that characteristic root s is located on a left half of the complex plane assuming that $det\ SI - \hat{A}I = 0$.

On the other hand, peripheral elements of compensator 102 are arranged such that, as shown in FIG. 16, ON/OFF control of contactless relay 105 is performed in accordance with a signal from actuator 67 so as to short-circuit resistor Rd connected between the input and output terminals of operation amplifier 106, and when actuator 67 outputs a signal for turning on relay 105, loop L is deenergized.

In FIG. 14B, a subtractor 181 is connected between switch 80 and state observer 101, a target value generator 79 is connected between subtractor 181 and actuator 67 and a target value generator 180 for generating a zero target value is connected to subtractor 180. The circuit shown in FIG. 14B is operated in a similar manner as that of FIG. 14A and also has an advantage same as that of FIG. 14B.

According to this embodiment, since speed $\Delta z$ can be observed without using a differentiator, an adverse effect of an external electrical noise from floating carrier 15 is reduced.

In addition, actuator 67 of the present invention is not limited to the arrangement shown in FIG. 10 but may have arrangements as shown in FIGS. 17 and 18. That is, in the arrangement shown in FIG. 17, external command converter 107 is constituted by transmitter 108 and receiver 109 for transmitting/receiving radio waves, and voltage generator 94. As compared with the above-mentioned case wherein optical signals are transmitted/received, mounting positions of transmitting and receiving sections need not be so strictly adjusted.

Furthermore, in the arrangement shown in FIG. 18, external command converter 110 is constituted by five lever switches 111 mounted on carrier 15, and generator 94 interlocked with ON/OFF operations of switches 111 to output open/close signals of the switches, resulting in a simple arrangement of the system.

Thus, the present invention can be modified within the spirit and scope of the invention regardless of analog or digital arrangement as long as the control system includes a zero power feed-back control system.

As has been described above, according to the present invention, since the zero power feed-back loop is deenergized and the target value is gradually varied in the soft landing or starting mode, the steady deviation of the gap length can be gradually varied. For this reason, the carrier can be softly fixed on the guide rails or softly started to flow from the guide rails, thereby preventing destruction of the carrier or cargo, or generation of dust.

What is claimed is:

1. A transporting system for transporting cargo to a predetermined position, comprising:
    a carrier for carrying cargo;
    at least one rail extending along a running path of said carrier and having a bottom section made of a ferromagnetic material;
    floating means including a plurality of magnetic units having respective combinations of permanent magnets and electromagnets provided on said carrier such as to face said rail, said carrier being caused to float with respect to said rail by electromagnetic attractive forces acting between said magnets and said bottom section of said rail, each magnetic unit comprising two faces which are located opposite the bottom section of said rail, each magnetic unit producing a magnetic flux which emerges from one of said faces and extends through a gap to the bottom section of said rail, passes through said bottom section, and returns to the magnetic unit through a gap between the bottom section and the other face;
    means, provided on said carrier, for generating an exciting current;
    sensing means provided on said carrier for sensing one of said gaps between each magnetic unit and said rail and for sensing the exciting current to generate an output signal;
    means for controlling the exciting current, which includes zero steady-state power control means for maintaining the steady-state exciting current supplied to said electromagnets to be substantially zero in a stable floating condition in response to the output signal of said sensing means, even when an external force is applied to said carrier; and means for generating a gradually varying target value and setting said controlling means in one of a zero steady-state power control mode, a soft start mode and a soft landing mode in accordance with an external command, said zero steady-state power control means being energized in the zero steady-state power control mode, said zero steady-state power conrtrol means being deenergized and said control means being operated in accordance with a target value and the output signal of the sensing means;

wherein said setting means includes mechanically noncontacting signal transmitting means, and an external command is externally transmitted to said setting means through said signal transmitting means.

2. A system according to claim 1, wherein said signal transmitting means includes:

light emitting means, provided outside said carrier, for generating an optical signal; and photo detecting means, provided on said carrier, for receiving the optical signal and converting it into an electrical signal.

3. A system according to claim 1, wherein said zero steady-state power control means includes an integrating compensator for integrating with a predetermined gain a deviation between a value of the exciting current of said electromagnets detected by said sensing means and a target value from said setting means, and means for feeding back an output value from said integrating compensator to the exciting current of said electromagnets.

4. A system according to claim 1, wherein said zero steady-state power control means includes means for multiplying predetermined gains to deviations between the detected values of a gap length, a speed, and an exciting current detected by said sensing means and the output values from said setting means, the predetermined gains not being zero at the same time, and for feeding back the product values to the exciting current through a filter having a primary transfer function.

5. A system according to claim 1, wherein said zero steady-state power control means includes a state observer for observing a magnitude of an external force along a direction of the gap length acting on said carrier in accordance with the output value from said sensing means, and means for multiplying a predetermined gain to a deviation between the magnitude of the external force observed by said state observer and the target value from said setting means and for feeding back the product to the exciting current.

6. A system according to claim 1, wherein said zero steady-state power control means includes a state observer for observing a magnitude of an external force along a direction of the gap length acting on said carrier in accordance with the output value from said sensing means, and means for feeding back a deviation between a value obtained by multiplying the output value from said state observer by a predetermined gain and the output value from said setting means to the exciting current.

7. A system according to claim 1, wherein said setting means generates a target value to be compared with at least one of detected values of a gap length between said electromagnets and said guide rail, a rate of change of the gap length, an acceleration of change of the gap length, and the exciting current of said electromagnets.

8. A transporting system for transporting cargo to a predetermined position, comprising:

a carrier for carrying cargo;

at least one rail extending along a running path of said carrier and having a bottom section made of a ferromagnetic material;

floating means including a plurality of magnetic units having respective combinations of permanent magnets and electromagnets provided on said carrier such as to face said rail, said carrier being caused to float with respect to said rail by electromagnetic attractive forces acting between said magnets and said bottom section of said rail, each magnetic unit comprising two faces which are located opposite the bottom section of said rail, each magnetic unit producing a magnetic flux which emerges from one of said faces and extends through a gap to the bottom section of said rail, passes through said bottom section, and returns to the magnetic unit through a gap between the bottom section and the other face;

means, provided on said carrier, for generating an exciting current;

sensing means provided on said carrier for sensing one of said gaps between each magnetic unit and said rail and for sensing the exciting current to generate an output signal;

means for controlling the exciting current, which includes zero steady-state power control means for maintaining the steady-state exciting current supplied to said electromagnets to be substantially zero in a stable floating condition in response to the output signal of said sensing means, even when an external force is applied to said carrier; and means for generating a gradually varying target value and setting said controlling means in one of a zero steady-state power control mode, a soft start mode and a soft landing mode in accordance with an external command, said zero steady-state power control means being energized in the zero steady-state power control mode, said zero steady-state power control means being deenergized and said control means being operated in accordance with a target value and the output signal of the sensing means;

wherein said setting means includes means for generating, in accordance with a command, a first actuating signal for gradually floating said carrier and a second actuating signal for gradually landing said carrier on said rail.

* * * * *